US011947992B2

(12) United States Patent
Tan et al.

(10) Patent No.: US 11,947,992 B2
(45) Date of Patent: Apr. 2, 2024

(54) METHODS AND APPARATUSES FOR MANAGING TLB CACHE IN VIRTUALIZATION PLATFORM

(71) Applicant: Alipay (Hangzhou) Information Technology Co., Ltd., Zhejiang (CN)

(72) Inventors: Jian Feng Tan, Zhejiang (CN); Ti Wei Bie, Zhejiang (CN); An Qi Shen, Zhejiang (CN); Yong He, Zhejiang (CN); Xin Chen, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/353,018

(22) Filed: Jul. 14, 2023

(65) Prior Publication Data

US 2023/0359481 A1 Nov. 9, 2023

Related U.S. Application Data

(63) Continuation of application No. PCT/CN2022/113142, filed on Aug. 17, 2022.

(30) Foreign Application Priority Data

May 9, 2022 (CN) .......................... 202210496390.0

(51) Int. Cl.
*G06F 9/455* (2018.01)
*G06F 12/1027* (2016.01)
(52) U.S. Cl.
CPC ...... *G06F 9/45558* (2013.01); *G06F 12/1027* (2013.01); *G06F 2009/45583* (2013.01)
(58) Field of Classification Search
None
See application file for complete search history.

(56) References Cited

U.S. PATENT DOCUMENTS

2008/0140897 A1 6/2008 Ganguly
2010/0274987 A1 10/2010 Subrahmanyam et al.
(Continued)

FOREIGN PATENT DOCUMENTS

CN 105993004 A 10/2016
CN 110196757 A 9/2019
CN 114595164 A 6/2022

OTHER PUBLICATIONS

Mengyuan Li "TLB Poisoning Attacks on AMD Secure Encrypted Virtualization", 2021 Association for Computing Machiner (Year: 2021).*

*Primary Examiner* — Wynuel S Aquino
(74) *Attorney, Agent, or Firm* — Seed IP Law Group LLP

(57) ABSTRACT

Implementations of the present specification provide a method and an apparatus for managing a TLB cache in a virtualization platform, where the virtualization platform runs a plurality of virtual machines, each virtual machine is allocated with a unique VPID, and all virtual logical processors in the virtual machine share the VPID; and a guest process running in the virtual machine is allocated with a PCID. An identifier field of a TLB entry in the TLB cache includes a VPID and a PCID. The method includes: in response to detecting a target guest process involving an invalid address mapping relationship, obtaining a current VPID and a current PCID corresponding to the target guest process; classifying the current PCID into an invalid PCID set corresponding to the current VPID, and selecting a PCID from an available PCID set of a target virtual machine as an updated PCID; and allocating the updated PCID to the target guest process, so an updated entry for the target guest process is recorded in a TLB cache, where an identifier field of the updated entry includes the updated PCID.

20 Claims, 3 Drawing Sheets

(56) References Cited

U.S. PATENT DOCUMENTS

| | | | |
|---|---|---|---|
| 2014/0358515 A1* | 12/2014 | Sreedhar | G06F 9/4552 |
| | | | 703/26 |
| 2017/0097895 A1* | 4/2017 | Snyder, II | G06F 12/10 |
| 2017/0357595 A1* | 12/2017 | Northup | G06F 12/1027 |
| 2020/0012509 A1* | 1/2020 | Khan | G06F 9/45558 |

* cited by examiner

METHODS AND APPARATUSES FOR MANAGING TLB CACHE IN VIRTUALIZATION PLATFORM

TECHNICAL FIELD

One or more implementations of the present specification relate to a virtualization platform, and in particular, to methods and apparatuses for managing a TLB cache in a virtualization platform.

BACKGROUND

A translation lookaside buffer (TLB) is a segment of cache in a CPU and is used to reduce the time required to access a memory location. The TLB is a part of a memory management unit (MMU) of a chip. A TLB entry therein stores a translation relationship from a recently used virtual address (or referred to as a logical address) to a physical address in a memory.

In a virtualization platform scenario, multiple virtual machines can be deployed on one physical platform (typically, a multi-core physical platform with multiple physical processors). Correspondingly, the physical processor is virtualized into a virtual logical processor for use by the virtual machine. The virtual machine can run a guest process. Because one process can have multiple threads that can be processed by different logical processors, and a virtualization task can be migrated in different logical/physical processors, a TLB entry corresponding to a guest process can be stored in multiple physical cores. When an abnormal address mapping occurs in a certain process, for example, some address translation relationships become invalid, related TLB entries also become invalid entries, which need to be removed from the TLB cache to ensure consistency between different physical cores. The procedure of removing invalid entries from the TLB cache is also referred to as TLB flush. TLB flush consumes system resources, and unnecessary TLB flush further reduces a cache hit rate. Therefore, frequent TLB flush reduces performance of the virtualization platform.

SUMMARY

One or more implementations of the present specification describe a method and an apparatus for managing a TLB cache on a virtual machine platform, so frequency of TLB flush can be reduced in a non-hardware manner, utilization of TLB entries can be improved, and performance of a virtualization platform can be improved.

According to a first aspect, a method for managing a TLB cache in a virtualization platform is provided, where the virtualization platform runs a plurality of virtual machines, each virtual machine is allocated with a unique virtual processor identifier VPID, and all virtual logical processors in the virtual machine share the VPID; a process context identifier PCID is allocated to a guest process running in the virtual machine; and the TLB cache stores a plurality of TLB entries, an identifier field of each TLB entry includes a VPID and a PCID, and the method includes: in response to detecting a target guest process involving an invalid address mapping relationship, obtaining a current VPID of a target virtual machine to which the target guest process belongs and a current PCID allocated to the target guest process; classifying the current PCID into an invalid PCID set corresponding to the current VPID; selecting a PCID from an available PCID set of the target virtual machine as an updated PCID; and allocating the updated PCID to the target guest process such that the TLB cache records an updated entry for the target guest process, an identifier field of the updated entry including the updated PCID.

According to an implementation, the method further includes classifying the updated PCID into an in-use PCID set of the target virtual machine.

According to an implementation, the selecting the PCID from the available PCID set of the target virtual machine as the updated PCID includes: determining whether a first available PCID set corresponding to the current VPID is empty; in response to that the first available PCID set corresponding to the current VPID is not empty, selecting the updated PCID from the first available PCID set; and in response to that the first available PCID set corresponding to the current VPID is empty, allocating an updated VPID to the target virtual machine, and setting the invalid PCID set corresponding to the current VPID to a second available PCID set corresponding to the updated VPID; and selecting the updated PCID from the second available PCID set.

Further, in an implementation of the above implementation, allocating the updated VPID to the target virtual machine is performed by a host operating system of the virtualization platform; and setting the invalid PCID set corresponding to the current VPID to the second available PCID set corresponding to the updated VPID is performed by a guest operating system of the target virtual machine.

In an implementation of the above implementation, the allocating the updated VPID to the target virtual machine includes: classifying the current VPID into an invalid VPID set; and selecting a VPID from an available VPID set as the updated VPID, allocating the updated VPID to the target virtual machine, and classifying the updated VPID into an in-use VPID set.

Still further, in an example, the selecting the VPID from the available VPID set as the updated VPID includes: determining whether a current first available VPID set of the virtualization platform is empty; in response to that the current first available VPID set of the virtualization platform is not empty, selecting the updated VPID from the first available VPID set; and in response to that the current first available VPID set of the virtualization platform is empty, resetting the invalid VPID set to a second available VPID set, and selecting the updated VPID from the second available VPID set.

According to an implementation, the invalid PCID set is recorded by using a bit mapping graph; and the bit mapping graph includes multiple locations, a location corresponds to a PCID and has a status bit group, a value of the status bit group being a first value indicates that a PCID corresponding to the location is invalid, the value of the status bit group being a second value indicates that the PCID corresponding to the location is available, and the value of the status bit group being a third value indicates that the PCID corresponding to the location is in use.

In the case of the bit mapping graph, the setting the invalid PCID set corresponding to the current VPID to the second available PCID set corresponding to the updated VPID includes: determining multiple locations in the bit mapping graph and having the first value as status bit group values, and modifying the status bit group values of the multiple locations to the second value.

According to an implementation, the invalid PCID set is recorded by using an invalid PCID list; and the setting the invalid PCID set corresponding to the current VPID to the second available PCID set corresponding to the updated VPID includes: modifying an attribute label of the invalid PCID list to obtain an available PCID list as the second available PCID set.

In an implementation, before the classifying the current PCID into the invalid PCID set corresponding to the current VPID, the method further includes: determining whether the current PCID is a predetermined PCID, the predetermined PCID being shared by multiple predetermined processes; and in response to that the current PCID is not the predetermined PCID, classifying the current PCID into the invalid PCID set.

Further, the multiple predetermined processes each has performance importance less than a specific threshold.

According to a second aspect, an apparatus for managing a TLB cache in a virtualization platform is provided, where the virtualization platform runs a plurality of virtual machines, each virtual machine is allocated with a unique virtual processor identifier VPID, and all virtual logical processors in the virtual machines share the VPID; A process context identifier PCID is allocated to a guest process running in the virtual machine; and The TLB cache stores a plurality of TLB entries, where an identifier field of any TLB entry includes VPID and PCID, and the apparatus includes: an acquisition unit, configured to: in response to detecting a target guest process involving an invalid address mapping relationship, obtain a current VPID of a target virtual machine to which the target guest process belongs and a current PCID allocated to the target guest process; an invalidation unit, configured to classify the current PCID into an invalid PCID set corresponding to the current VPID; a selection unit, configured to select a PCID from an available PCID set of the target virtual machine as an updated PCID; and an allocation unit, configured to allocate the updated PCID to the target guest process such that the TLB cache records an updated entry for the target guest process, an identifier field of the updated entry including the updated PCID.

According to a third aspect, a computer readable storage medium that stores a computer program is provided, and when the computer program is executed on a computer, the computer is caused to perform the method of the first aspect.

According to a fourth aspect, a computing device is provided and includes a memory and a processor. Executable code is stored in the memory, and when executing the executable code, the processor implements the method of the first aspect.

In the technical solutions provided in the implementations of the present specification, a VPID/PCID is re-allocated to a target guest process involving an invalid address mapping relationship, so when a virtual logical processor is migrated between different physical processors and a TLB entry corresponding to the target guest process needs to be accessed again, an updated TLB entry is used based on an updated VPID+PCID of the process. An original TLB entry (entry corresponding to the invalid mapping address relationships) that records an original PCID is no longer accessed and used. As such, frequency of TLB flush is greatly reduced, and platform performance is improved.

BRIEF DESCRIPTION OF DRAWINGS

To describe the technical solutions in the implementations of the present disclosure more clearly, the following briefly introduces the accompanying drawings required for describing the implementations. Clearly, the accompanying drawings in the following description are merely some implementations of the present disclosure, and a person of ordinary skill in the field can still derive other drawings from these accompanying drawings without creative efforts.

DESCRIPTION OF EMBODIMENTS

The solutions provided in the present specification are described below with reference to the accompanying drawings.

Figure 1:
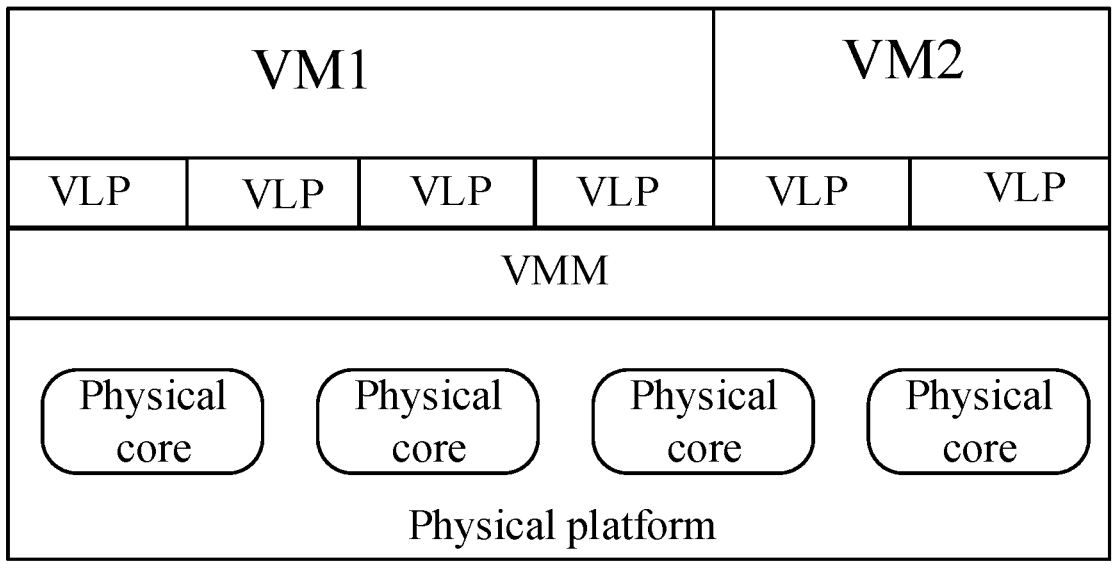
FIG. 1 is a schematic architecture diagram illustrating a virtualization platform.

FIG. 1 is a schematic architecture diagram illustrating a virtualization platform. As shown in the figure, one physical platform can have multiple physical processors, that is, multiple physical cores. A virtual machine can be deployed on such a physical platform by using a virtual machine management program, for example, a hypervisor, or referred to as a virtual machine manager VMM, so as to be implemented as a virtualization platform. For example, multiple virtual machines can be deployed on one physical platform. Correspondingly, one or more physical processors are virtualized into one or more virtual logical processors (VLP) for use by the virtual machine. A guest process can be run in the virtual machine.

Each guest process has its own address space, which includes a translation or mapping relationship from a virtual memory address (VA) (or a logical address) used in the process to a physical memory address. The logical processor can use a process context identifier (PCID) to distinguish between different address spaces, that is, distinguish between different processes. If there is no PCID, all translation lookaside buffer (TLB) entries are cleared when context switching is performed between different processes. Each virtual logical processor in the virtual machine can independently manage its PCID.

Further, in a scenario in which there are multiple virtual logical processors, a virtual processor identifier (VPID) is used in some virtualization operations. The logical processor can use the VPID to distinguish between different virtual logical processors. With the VPID, when switching between address spaces of different virtual logical processors, the logical processor can retain cached information without having to clear all TLB entries.

Therefore, in a technical scenario in which the VPID and the PCID are used, a TLB entry in a TLB cache records a VPID and a PCID corresponding to a process. At least a combination of the VPID and the PCID is used to distinguish different processes, and an address mapping relationship corresponding to a specific process is located.

Because one process can have multiple threads that can be processed by different logical processors, and a virtualization task can be migrated in different logical/physical processors, a TLB entry corresponding to a guest process can be stored in multiple physical cores. When an address translation relationship involved in a certain process becomes invalid, a related TLB entry also becomes an invalid entry, which needs to be removed from the TLB cache to ensure consistency between different physical cores with respect to the entry. The procedure of removing invalid entries from the TLB cache is also referred to as TLB flush. TLB flush consumes system resources, and unnecessary TLB flush further reduces a cache hit rate. Therefore, frequent TLB flush reduces performance of the virtualization platform.

For example, in a cloud naive scenario, a process is expected to be scheduled and invoked in a CPU sharing manner, for example, multiple PODs (or clusters), e.g., a smallest or most basic task execution unit in a containerization scenario, are scheduled and invoked in one shared pool, and each POD can be frequently migrated or switched between multiple physical cores. In such a scenario, TLB flush may need to be performed frequently according to a conventional technology, which has significant adverse impact on platform performance.

The inventors created a new technical solution, in which, without changing a storage structure of the TLB cache, the VPID/PCID is managed and allocated by using a new mechanism, which reduces frequency of TLB flush, and improves utilization of the TLB entry, thereby improving platform performance and efficiency.

First, system settings in this solution are described.

According to the implementations of the present specification, a unique VPID is allocated to each virtual machine, not a virtual logical processor. All virtual logical processors in a virtual machine share a VPID of the virtual machine in which the virtual logical processors are located. Allocation and management of the VPID can be performed by a kernel of a host operating system (host OS). With respect to a status of the VPID, the kernel of the host OS can maintain three sets: an available VPID set, an in-use VPID set, and an invalid VPID set, where the available VPID set includes an unused and allocatable VPID; the in-use VPID set includes a VPID currently being used by each virtual machine; and the invalid VPID set includes a used and invalid VPID. A total quantity of VPIDs depends on hardware setting, and in some implementations, depends on a quantity of bits recording a VPID field.

Further, the virtual machine allocates a PCID to each guest process running in the virtual machine. Allocation and management of the PCID can be performed by a kernel of a guest operating system (Guest OS) in the virtual machine. With respect to a status of the PCID, the kernel of the guest OS can also maintain three sets: an available PCID set, an in-use PCID set, and an invalid PCID set, where the available PCID set includes an unused, allocatable PCID; the in-use PCID set includes a PCID currently being used by each guest process; and the invalid PCID set includes a used and invalid PCID. A total quantity of PCIDs depends on hardware setting, and in some implementations, depends on a quantity of bits recording a PCID field. For example, in a certain mainstream chip, 12 bits are used to record the PCID. The total quantity of PCIDs, that is, a sum of elements in the above three sets, is 4096.

In an implementation, considering that there are a relatively large quantity of guest processes, a special PCID can be determined, e.g., predetermined or dynamically determined, and some threads can be set to share the special PCID, which can reduce occupation of the PCID by some less important threads. These threads can be manually set, or can be determined by a system by using some indicators. For example, a determined, e.g., predetermined or dynamically determined, type of processes can be selected. A performance criterion, e.g., a degree of importance of the performance of these determined processes, is less than a threshold, such as a periodic script, and the special PCID is shared.

The available set, in-use set, and invalid set of the VPID/PCID can be recorded in multiple manners. For example, in some implementations, the three sets can be recorded by using three lists. In some implementations, the available set and the invalid set can be respectively recorded by using two lists, and if a certain ID is not in the two lists, it is determined that the ID belongs to the in-use set.

In some implementations, the three sets can be recorded by using a bit mapping graph. In an example of the PCID, a corresponding bit mapping graph includes multiple locations, each location corresponds to one PCID and has a status bit group, a value of the status bit group being a first value indicates that a PCID corresponding to the location is invalid, the value of the status bit group being a second value indicates that the PCID corresponding to the location is available, and the value of the status bit group being a third value indicates that the PCID corresponding to the location is in use. In some implementations, three values are used to indicate three states, and 2 bits can be set for the status bit group. For example, the first value can be 11, the second value can be 00, and the third value can be 01 or 10. It should be understood that a value of the status bit group can be set in various ways, and the above describes only an example.

It should be noted that the three sets corresponding to the VPID and the three sets corresponding to the PCID can be recorded in the same form or in different forms, which is not limited herein.

Through the allocation mode described herein, a guest process can still be distinguished through a combination of the VPID and the PCID. In addition, the same process running on any virtual logical processor can share a TLB on any physical processor. In a conventional solution, when different threads of the same process run on different virtual logical processors (due to different VPIDs), the TLB entry cannot be shared on the same physical core. Therefore, in the system setting manner of the above implementation, sharing of the TLB entry can be promoted, and utilization of the TLB entry can be improved.

Based on the above system settings, TLB flush can be avoided by allocating a new VPID/PCID to a certain process when the process involves invalid address mapping. The following describes the procedure.

Figure 2:
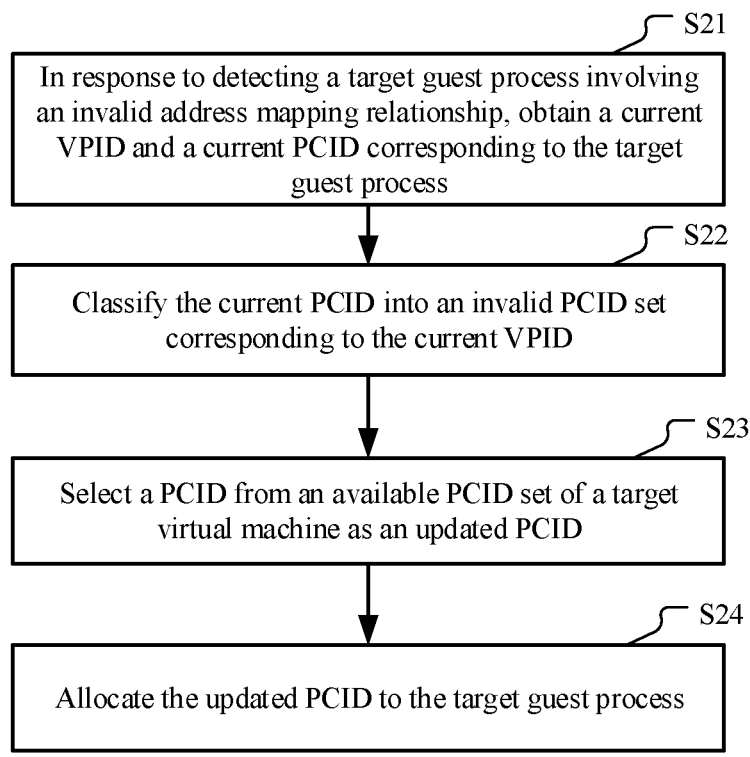
FIG. 2 is a flowchart illustrating a method for managing a TLB cache in a virtualization platform according to an implementation.

FIG. 2 is a flowchart illustrating a method for managing a TLB cache in a virtualization platform according to an implementation. The virtualization platform runs a plurality of virtual machines. According to the above system settings, each virtual machine is allocated with a unique virtual processor identifier (VPID), and all virtual logical processors in the virtual machine share the VPID. A process context identifier (PCID) is allocated to a guest process running in the virtual machine. Accordingly, the TLB cache stores a plurality of TLB entries, where an identifier field of each TLB entry includes a VPID and a PCID. In such a setting, according to an implementation, the management method includes the following steps.

Step 21: In response to detecting a target guest process involving an invalid address mapping relationship, obtain a current VPID of a target virtual machine to which the target guest process belongs and a current PCID allocated to the target guest process.

In some implementations, in multiple cases, address mapping of a process can involve an invalid mapping relationship. For example, a process can declare, by means of unmap system invocation, that a segment of memory is discarded. As such, an address mapping relationship of the segment of memory, that is, a mapping relationship from a virtual address (VA) and a physical address (PA), will be invalid. As such, a process that performs an unmap operation can be used as a target guest process. For another example, a mapping relationship of a segment of memory of a certain process can be invalid due to a system reason, and such a process can also be used as a target guest process. It should be understood that if the invalid address mapping relationship is recorded in the TLB cache, a corresponding TLB entry should also be invalid. As a result, the target guest process is a guest process that can cause the TLB entry to be invalid. Once such a target guest process is discovered, a current VPID of a target virtual machine to which the target guest process belongs and a current PCID allocated to the target guest process in the target virtual machine can be obtained.

Step 22: Classify the current PCID into an invalid PCID set corresponding to the current VPID.

As described herein, three sets of PCIDs can be maintained in the virtual machine: an available PCID set, an in-use PCID set, and an invalid PCID set. Correspondingly, the target virtual machine maintains the three sets in the name of the current VPID, so as to have three sets corresponding to the current VPID. In step 22, the target virtual machine can classify the current PCID of the target guest process into the invalid PCID set corresponding to the current VPID, so as to mark the current PCID as a used and invalid PCID.

For example, when the set is recorded in a list form, the current PCID can be moved from the in-use PCID list to the invalid PCID list. When the set is recorded in a form of a bit mapping graph, a status bit group of a location corresponding to the current PCID can be changed from a value indicating an "in use" state to a value indicating an "invalid" state, so the current PCID is classified into the invalid PCID set.

In some implementations, a special PCID is reserved in a total PCID set for sharing by multiple determined types of processes. In this case, before step 22, whether the current PCID is the special PCID further needs to be determined. Step 22 and subsequent steps 23-24 are for a non-special PCID process.

Next, in step 23, a PCID is selected from the available PCID set of the target virtual machine as an updated PCID, and in step 24, the updated PCID is allocated to the target guest process. Correspondingly, the updated PCID can be classified into the in-use PCID set of the target virtual machine.

As described herein, a quantity of PCIDs maintained by a virtual machine is limited, and these PCIDs are classified into an in-use set, an available set, and an invalid set. In step 23, the updated PCID is selected based on a current status of each set, and is allocated to the target guest process. The following describes in detail an implementation procedure of step 23.

Figure 3:
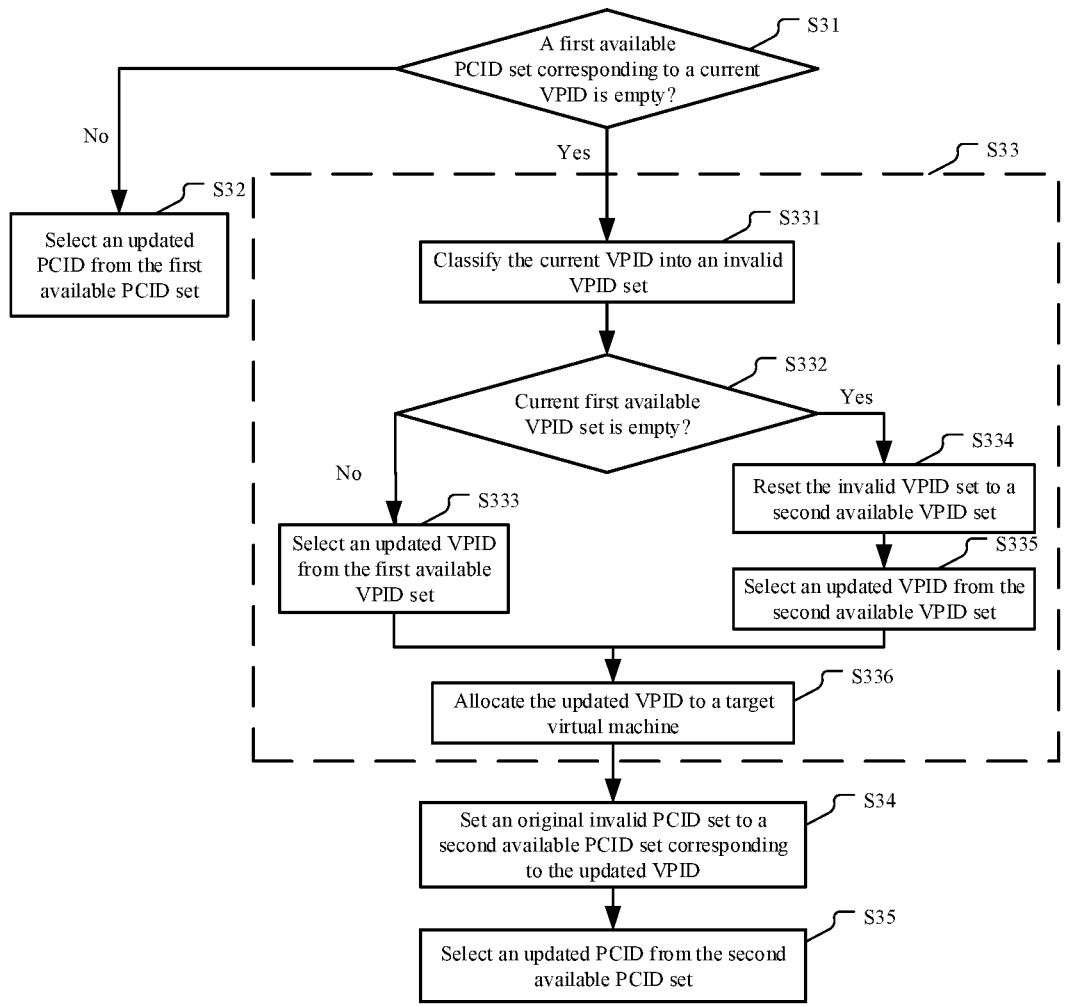
FIG. 3 shows a procedure of selecting an updated PCID in an implementation.

FIG. 3 shows a procedure of selecting an updated PCID in an implementation, that is, a sub-step procedure of step 23. As shown in FIG. 3, in step 31, it is determined whether an available PCID set corresponding to the current VPID is empty. For clarity and distinction, the available PCID set corresponding to the current PCID is denoted as a first available PCID set. For example, assume that the current VPID is VID1, and the current PCID is PID1. The first available PCID set is an available PCID set corresponding to VID1.

If the first available PCID set is not empty, in step 32, a PCID is sequentially or randomly selected from the first available PCID set, for example, denoted as PID2, as the updated PCID.

If a determining result of step 31 is that the first available PCID set is empty, that is, the target virtual machine has no available PCID in VID1, in step 33, an updated VPID is allocated to the target virtual machine, for example, denoted as VID2. Then, in step 34, an invalid PCID set in the original VID1 is set to an available PCID set corresponding to the updated VPID (VID2). The set can be referred to as a second available PCID set. As described above, processes are identified and located in TLB entries based on a combination of the VPID and the PCID. Because the VPID is updated, a previously used PCID can be used again, forming a new combination with the updated VPID. In some implementations, in this step, only an invalid PCID set in a previous VPID is reset to an available PCID set, and the in-use PCID set remains unchanged. There are multiple reset manners. For example, in the case of a list, an attribute or a label of the list is changed. In the case of a bit mapping graph, a location that is of the status bit group and that originally has the first value (indicating invalid) is changed to the second value (indicating available). Next, in step 35, an updated PCID, such as PID2, can be selected from the second available PCID set.

Execution of branches of steps 33-35 depends on update of the VPID of the target virtual machine. In step 33, the VPID is updated for the target virtual machine, and logic similar to the updated PCID is used, but is executed by a host OS. As described herein, the host OS also maintains three sets for the VPID: an available VPID set, an invalid VPID set, and an in-use VPID set. Similarly, based on these sets, the updated VPID can be allocated to the target virtual machine.

For example, in step 331, the current VPID (for example, VID1) is classified into the invalid VPID set.

Then, a VPID of the available VPID set is selected as the updated VPID. For example, in step 332, it is determined whether the current available VPID set (the first available VPID set) of the virtual machine platform is empty. If the current available VPID set is not empty, in step 333, one VPID of the first available VPID set is selected as the updated VPID.

If the first available VPID set is empty, in step 334, the invalid VPID set is reset to a second available VPID set, and in step 335, a VPID of the second available VPID set is selected as the updated VPID.

The two branches converge to step 336 where the updated VPID is allocated to the target virtual machine, and the updated VPID is classified into the in-use VPID set. As such, update of the VPID of the target virtual machine is implemented. Further, the updated PCID can be allocated to the target process based on the updated VPID.

As such, through the above procedure, the updated PCID is allocated to the target guest process. Thus, the TLB entry for the process in the TLB cache is also updated, and an identifier field of the updated entry records the updated PCID (and a possible updated VPID). This enables the updated TLB entry to be used according to the updated combination of VPID+PCID of the process when the virtual logical processor is migrated between different physical processors and it is necessary to access the TLB entry corresponding to the target guest process again. An original TLB entry, e.g., an entry whose mapping address is invalid, that records an original PCID is no longer accessed and used. As such, it is not necessary to immediately perform TLB flush thereon. Only when the invalid sets of the VPID and the PCID are reset to available sets, related entries in the TLB cache are cleared. However, frequency of such a clearing operation is far lower than that of clearing entries with abnormal mapping in the conventional technology. When a special PCID is set, a quantity of available PCIDs is further increased, frequency of resetting an invalid set is reduced, frequency of TLB flush is further reduced, and platform performance is further improved.

Figure 4:
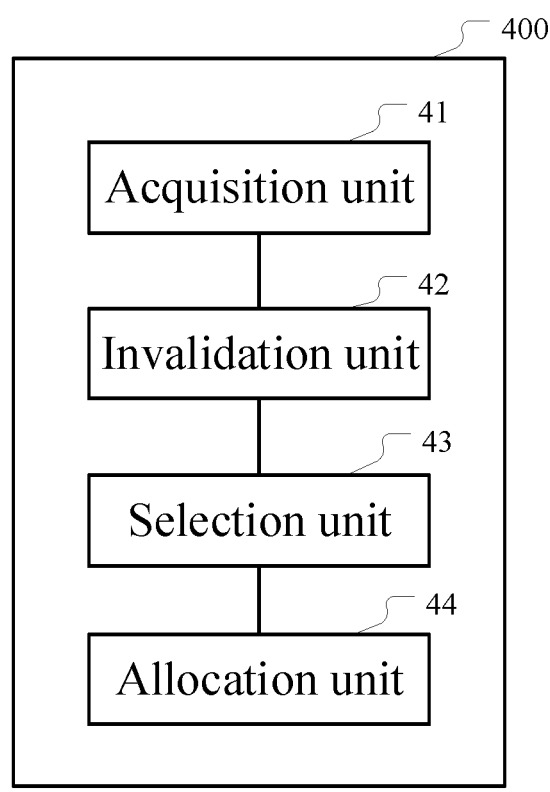
FIG. 4 is a schematic structural diagram illustrating a management apparatus according to an implementation.

In addition, corresponding to the above method, an implementation of the present specification further discloses an apparatus for managing a TLB cache in a virtualization platform, where the virtualization platform runs a plurality of virtual machines, each virtual machine is allocated with a unique virtual processor identifier VPID, and all virtual logical processors in the virtual machine share the VPID; a process context identifier PCID is allocated to a guest process running in the virtual machine; and the TLB cache stores a plurality of TLB entries, and an identifier field of each TLB entry includes a VPID and a PCID. FIG. 4 is a schematic structural diagram illustrating a management apparatus according to an implementation. As shown in FIG. 4, the apparatus 400 includes: an acquisition unit 41, configured to: in response to detecting a target guest process involving an invalid address mapping relationship, obtain a current VPID of a target virtual machine to which the target guest process belongs and a current PCID allocated to the target guest process; an invalidation unit 42, configured to classify the current PCID into an invalid PCID set corresponding to the current VPID; a selection unit 43, configured to select a PCID from an available PCID set of the target virtual machine as an updated PCID; and an allocation unit 44, configured to allocate the updated PCID to the target guest process such that the TLB cache records an updated entry for the target guest process, an identifier field of the updated entry including the updated PCID.

According to an implementation of another aspect, a computer readable storage medium on which a computer program is stored is further provided. When the computer program is executed in a (one or more) computer, the (one or more) computer is caused to, individually or collectively, perform the method described with reference to FIG. 2 and FIG. 3.

According to an implementation of still another aspect, a computing device is further provided and includes a (one or more) memory or storage device and a (one or more) processor. Executable code is stored in the memory or storage device, and when executing the executable code, the (one or more) processor, individually or collectively, implements the method with reference to FIG. 2 and FIG. 3.

A person skilled in the art should be aware that, in one or more of the above examples, the functions described in the present specification can be implemented by using hardware, software, firmware, or any combination thereof. When these functions are implemented by software, they can be stored in a computer readable medium or transmitted as one or more instructions or code lines on the computer readable medium.

The specific implementations mentioned above further describe the object, technical solutions and beneficial effects of the present disclosure. It should be understood that the above descriptions are merely specific implementations of the present disclosure and are not intended to limit the protection scope of the present disclosure. Any modification, equivalent replacement and improvement made based on the technical solution of the present disclosure shall fall within the protection scope of the present disclosure.

What is claimed is:

1. A method for managing a translation lookaside buffer (TLB) cache in a virtualization platform, wherein the virtualization platform runs a plurality of virtual machines, the method comprising: configuring the PLB, the configuring including: allocating each virtual machine with a virtual processor identifier (VPID), all virtual logical processors in the virtual machine sharing the VPID; allocating a process context identifier (PCID) to a guest process running in a virtual machine; and controlling the TLB cache to store a plurality of TLB entries, an identifier field of each TLB entry including a combination of a VPID and a PCID; detecting a target guest process that includes an unmapped operation having invalid address mapping between a virtual address and a physical address: in response to detecting the target guest process, obtaining a current VPID of a target virtual machine to which the target guest process belongs and a current PCID allocated to the target guest process; classifying the current PCID into an invalid PCID set corresponding to the current VPID; updating the combination corresponding to the target guest process by one or more of selecting an updated PCD from an available PCID set of the target virtual machine or allocating an updated VPID to the target virtual machine; and updating the PLB cache by recording in the TLB cache an updated entry for the target guest process, an identifier field of the updated entry including the updated combination.

2. The method according to claim 1, further comprising classifying the updated PCID into an in-use PCID set of the target virtual machine.

3. The method according to claim 1, wherein the selecting the updated PCID from the available PCID set of the target virtual machine as the updated PCID includes:
   determining whether a first available PCID set corresponding to the current VPID is empty;
   in response to that the first available PCID set corresponding to the current VPID is not empty, selecting the updated PCID from the first available PCID set; and
   in response to that the first available PCID set corresponding to the current VPID is empty, allocating an updated VPID to the target virtual machine, setting the invalid PCID set corresponding to the current VPID to a second available PCID set corresponding to the updated VPID, and selecting the updated PCID from the second available PCID set.

4. The method according to claim 3, wherein the allocating the updated VPID to the target virtual machine is performed by a host operating system of the virtualization platform; and
   the setting the invalid PCID set corresponding to the current VPID to the second available PCID set corresponding to the updated VPID is performed by a guest operating system of the target virtual machine.

5. The method according to claim 3, wherein the allocating the updated VPID to the target virtual machine includes:
   classifying the current VPID into an invalid VPID set; and
   selecting a VPID from an available VPID set as the updated VPID, allocating the updated VPID to the target virtual machine, and classifying the updated VPID into an in-use VPID set.

6. The method according to claim 5, wherein the selecting the VPID from the available VPID set as the updated VPID includes:
   determining whether a current first available VPID set of the virtualization platform is empty;
   in response to that the current first available VPID set of the virtualization platform is not empty, selecting the updated VPID from the first available VPID set; and
   in response to that the current first available VPID set of the virtualization platform is empty, resetting the invalid VPID set to a second available VPID set, and selecting the updated VPID from the second available VPID set.

7. The method according to claim 3, wherein:
the invalid PCID set is recorded by using a bit mapping graph;
the bit mapping graph includes multiple locations, a location corresponding to a PCID and having a status bit group; and
a value of the status bit group being a first value indicates that a PCID corresponding to the location is invalid, the value of the status bit group being a second value indicates that the PCID corresponding to the location is available, and the value of the status bit group being a third value indicates that the PCID corresponding to the location is in use.

8. The method according to claim 7, wherein the setting the invalid PCID set corresponding to the current VPID to the second available PCID set corresponding to the updated VPID includes:
determining multiple locations in the bit mapping graph and having the first value as status bit group values, and modifying the status bit group values of the multiple locations to the second value.

9. The method according to claim 3, wherein:
the invalid PCID set is recorded by using an invalid PCID list; and
the setting the invalid PCID set corresponding to the current VPID to the second available PCID set corresponding to the updated VPID includes:
modifying an attribute label of the invalid PCID list to obtain an available PCID list as the second available PCID set.

10. The method according to claim 1, further comprising:
before the classifying the current PCID into the invalid PCID set corresponding to the current VPID, determining whether the current PCID is a determined PCID, the determined PCID being shared by multiple determined processes; and
in response to that the current PCID is not the determined PCID, classifying the current PCID into the invalid PCID set.

11. The method according to claim 10, wherein the multiple determined processes each has a performance criterion less than a threshold.

12. The method according to claim 1, wherein the target guest process performs an unmap operation.

13. A computing system for managing a translation lookaside buffer (TLB) cache in a virtualization platform, wherein the virtualization platform runs a plurality of virtual machines, the computing system comprising one or more storage devices and one or more processors, the one or more storage devices, individually or collectively, having computer executable instructions stored thereon, which when executed by the one or more processors enable the one or more processors to, individually or collectively, perform acts including: configuring the TLB, the configuring including: allocating each virtual machine with a virtual processor identifier (VPID), all virtual logical processors in the virtual machine sharing the VPID; allocating a process context identifier (PCTD) to a guest process running in a virtual machine; and controlling the TLB cache to store a plurality of TLB entries, an identifier field of each TLB entry including a combination of a VPID and a PCID; detecting a target guest process that includes an unmapped operation having invalid address mapping between a virtual address and @ physical address; in response to detecting the target guest process, obtaining a current VPID of a target virtual machine to which the target guest process belongs and a current PCID allocated to the target guest process; classifying the current PCID into an invalid PCID set corresponding to the current VPID; selecting a PCID from an available PCID set of the target virtual machine as an updated PCID of the target guest process; and recording in the TLB cache an updated entry for the target guest process, an identifier field of the updated entry including the updated PCID, wherein the selecting the PCED from the available PCTD set of the target virtual machine ag, the updated PCID includes, determining whether a first available PCTD set corresponding to the current VPID is empty, in response to that the first available PCT set corresponding to the current VPID is not empty, selecting the updated PCED from the first available PCID set; and in response to that the first available PCID set corresponding to the current VPID is empty, allocating an updated VPID to the target virtual machine, setting the invalid PCD set corresponding to the current VPID to a second available PCED set corresponding to the undated VPID and selecting the updated PCID from the second available PCTD set.

14. The computing system according to claim 13, wherein the acts further include classifying the updated PCID into an in-use PCID set of the target virtual machine.

15. The computing system according to claim 13, wherein the allocating the updated VPID to the target virtual machine is performed by a host operating system of the virtualization platform; and
the setting the invalid PCID set corresponding to the current VPID to the second available PCID set corresponding to the updated VPID is performed by a guest operating system of the target virtual machine.

16. The computing system according to claim 13, wherein the allocating the updated VPID to the target virtual machine includes:
classifying the current VPID into an invalid VPID set; and
selecting a VPID from an available VPID set as the updated VPID, allocating the updated VPID to the target virtual machine, and classifying the updated VPID into an in-use VPID set.

17. The computing system according to claim 16, wherein the selecting the VPID from the available VPID set as the updated VPID includes:
determining whether a current first available VPID set of the virtualization platform is empty;
in response to that the current first available VPID set of the virtualization platform is not empty, selecting the updated VPID from the first available VPID set; and
in response to that the current first available VPID set of the virtualization platform is empty, resetting the invalid VPID set to a second available VPID set, and selecting the updated VPID from the second available VPID set.

18. The computing system according to claim 16, wherein the acts further include:
before the classifying the current PCID into the invalid PCID set corresponding to the current VPID,
determining whether the current PCID is a determined PCID, the determined PCID being shared by multiple determined processes; and
in response to that the current PCID is not the determined PCID, classifying the current PCID into the invalid PCID set.

19. A storage medium having executable instructions stored thereon for managing a transaction lookaside buffer (TLB) cache in a virtualization platform, wherein the virtualization platform runs a plurality of virtual machines; the executable instructions, when executed by one or more processors, enabling the one or more processors to, individually or collectively, perform acts comprising: configuring the PLB, the configuring including: allocating each virtual machine with a virtual processor identifier (VPI) all virtual logical processors in the virtual machine sharing the VPID, allocating a process context identifier (PCTD) to a guest process running in a virtual machine, and controlling the TLE cache to store a plurality of TLB entries, an identifier field of each TLB entry including a combination of a VPED and a PCUD, detecting a target guest process that includes an unmapped operation having invalid address mapping between a virtual address and e physical address: in response to detecting the target guest process, obtaining a current VPID of a target virtual machine to which the target guest process belongs and a current PCID allocated to the target guest process; classifying the current PCID into an invalid PCID set corresponding to the current VPID; updating the combination corresponding to the target guest process by one or more of selecting an updated PCID from an available PCID set of the target virtual machine or allocating an updated VPID to the target viral machine; and updating the TLB cache by recording in the TLB cache an updated entry for the target guest process, an identifier field of the updated entry including the updated combination.

20. The storage medium according to claim 19, wherein the selecting the updated PCID from the available PCID set of the target virtual machine as the updated PCID includes:
  determining whether a first available PCID set corresponding to the current VPID is empty;
  in response to that the first available PCID set corresponding to the current VPID is not empty, selecting the updated PCID from the first available PCID set; and
  in response to that the first available PCID set corresponding to the current VPID is empty, allocating an updated VPID to the target virtual machine, setting the invalid PCID set corresponding to the current VPID to a second available PCID set corresponding to the updated VPID, and selecting the updated PCID from the second available PCID set.

\* \* \* \* \*

UNITED STATES PATENT AND TRADEMARK OFFICE
CERTIFICATE OF CORRECTION

PATENT NO. : 11,947,992 B2  
APPLICATION NO. : 18/353018  
DATED : April 2, 2024  
INVENTOR(S) : Jian Feng Tan et al.

Page 1 of 1

It is certified that error appears in the above-identified patent and that said Letters Patent is hereby corrected as shown below:

In the Claims

Column 12, Claim 19, Line 63:
"managing a transaction lookaside" should read: -- managing a translation lookaside --

Column 13, Claim 19, Line 2:
"the PLB," should read: -- the TLB, --

Column 13, Claim 19, Line 3:
"(VPI)" should read: -- (VPID), --

Column 13, Claim 19, Line 5:
"(PCTD)" should read: -- (PCID) --

Column 13, Claim 19, Line 7:
"the TLE cache" should read: -- the TLB cache --

Column 13, Claim 19, Line 9:
"VPED and a PCUD," should read: -- VPID and a PCID; --

Signed and Sealed this  
Twenty-fourth Day of September, 2024

Katherine Kelly Vidal  
*Director of the United States Patent and Trademark Office*